Figure 1:
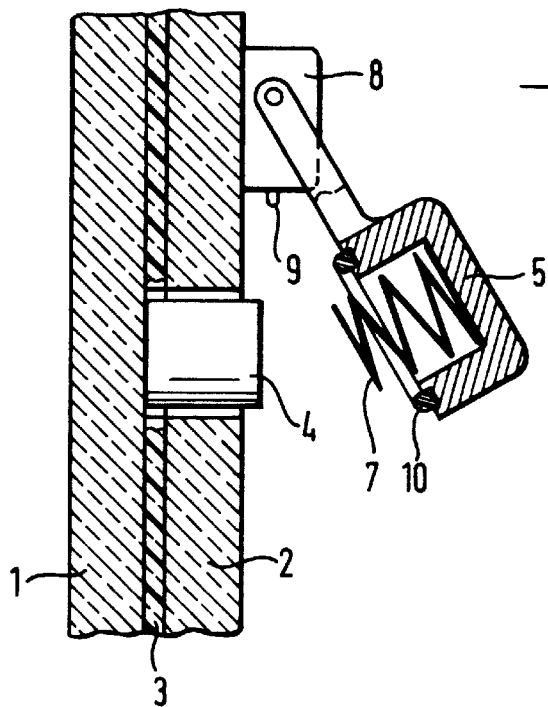

United States Patent
Didelot et al.

[11] Patent Number: 5,804,719
[45] Date of Patent: Sep. 8, 1998

[54] LAMINATED PLATE GLASS EQUIPPED WITH A SENSOR

[75] Inventors: Claude Didelot; Denis Mathivat, both of Thourotte; Martial de Paoli, Cuts; Anne Lamicq, Margny les Compiegne, all of France

[73] Assignee: Saint-Gobain Vitrage, Courbevoie, France

[21] Appl. No.: 686,698

[22] Filed: Jul. 26, 1996

[51] Int. Cl.⁶ .................. G01N 9/24; G05B 5/00
[52] U.S. Cl. .................. 73/335.01; 73/643; 318/483; 15/250.12
[58] Field of Search ............ 73/170.15, 335.01, 73/335.02, 629, 643; 318/483, 643, DIG. 2; 15/250.12

[56] References Cited

U.S. PATENT DOCUMENTS

| | | | |
|---|---|---|---|
| 4,170,145 | 10/1979 | Kennedy et al. | 73/620 |
| 4,185,502 | 1/1980 | Frank | 73/644 |
| 4,302,976 | 12/1981 | Bull | 73/639 |
| 4,403,510 | 9/1983 | DeWalle et al. | 73/644 |
| 4,584,508 | 4/1986 | Kobayashi et al. | 73/170.17 X |
| 4,603,316 | 7/1986 | Kobayashi et al. | 73/170.17 X |
| 4,640,133 | 2/1987 | Lecuru et al. | 73/639 |
| 4,797,605 | 1/1989 | Palanisamy | 324/65 R |
| 4,805,070 | 2/1989 | Koontz et al. | 73/335.02 X |
| 4,831,493 | 5/1989 | Wilson et al. | 73/335.02 X |
| 4,846,869 | 7/1989 | Palanisamy | 65/60.53 |
| 4,970,122 | 11/1990 | Palanisamy | 428/432 |
| 5,097,881 | 3/1992 | Mack | 73/622 X |
| 5,200,676 | 4/1993 | Mueller et al. | 15/250.12 X |
| 5,203,207 | 4/1993 | Sugiyama | 73/170.17 |
| 5,266,873 | 11/1993 | Arditi et al. | 318/483 |
| 5,304,936 | 4/1994 | Buschur | 73/304 C X |
| 5,323,637 | 6/1994 | Bendicks et al. | 73/29.01 |
| 5,453,676 | 9/1995 | Agrotis et al. | 318/643 |
| 5,539,289 | 7/1996 | Wiget | 318/483 |
| 5,560,245 | 10/1996 | Zettler et al. | 73/335.01 |
| 5,598,380 | 1/1997 | Saurer et al. | 318/483 X |

FOREIGN PATENT DOCUMENTS

| | | |
|---|---|---|
| 0-512-653-A1 | 5/1992 | European Pat. Off. . |
| 0-626-593-A1 | 5/1994 | European Pat. Off. . |
| 0-641-696-A1 | 8/1994 | European Pat. Off. . |
| WO 94/00319 | 1/1994 | WIPO . |

*Primary Examiner*—George M. Dombroske
*Assistant Examiner*—Paul D. Amrozowicz
*Attorney, Agent, or Firm*—Oblon, Spivak, McClelland, Maier & Neustadt, P.C.

[57] ABSTRACT

Laminated plate glass including at least one rigid sheet of glass (1, 2), at least one layer of plastic material (3), and a sensor (4) for the presence of foreign bodies on the outside of the plate glass. Its sensing side is held in close contact with the internal side of the external plate of glass (1). The sensor (4) is located in a space formed within the sheets (2) or layers (3) of the window other than the said external plate of glass (1). The said space is closed in a detachable manner by means of a cover (5) and/or lid (6) which exerts the desired force on the sensor (4); process for fabrication of this plate glass; convex laminated plate glass equipped with a sensor; sensor that can be used for making this plate glass.

17 Claims, 1 Drawing Sheet

LAMINATED PLATE GLASS EQUIPPED WITH A SENSOR

This invention pertains to plate glass, especially for a ground, sea, or air transport vehicle that is equipped with a system for sensing foreign bodies such as water on the external surface of the plate glass. More particularly, the invention pertains to a laminated plate glass provided with a sensing system that is capable of furnishing a signal that controls the operation of devices such as a windshield wiper. The invention also pertains to a laminated plate glass which is ready to be equipped, particularly, by such a sensing system.

Plate glass equipped with water or humidity sensing systems have already been described, for example, in the patent publications WO 94/00319, EP-A-0,512,653, EP-A-0,626,593. These sensing systems include a transducer that will emit at least one ultrasonic signal to propagate through the thickness of the plate glass and can receive a representative reflected signal of the presence or lack thereof of foreign bodies. The transducer is attached to the internal side of the plate glass, that is to say on the side of the plate glass facing the passenger compartment of the vehicle. The reflected signal received by the transducer is transformed into an electrical signal and compared to a reference threshold. The result of the comparison will then cause (or not) control of windshield wiper motor operation.

In order to ensure viability of the sensing system, it is necessary that the reflected signal not be subject to uncontrollable disturbances.

By placing the sensing system on a laminated plate glass, that is to say on the side of the window facing the passenger side of the vehicle as described in the previously mentioned documents, the intermediate layer of plastic material, generally made of plastified polyvinylbutyral (PVB), which is necessarily traversed by the incident signal and the reflected signal, is a source of considerable disturbance for this signal. In particular, the variations of the PVB properties as a function of temperature, related to the considerable thickness of the layer (normally on the order of 0.76 mm) will cause variations in the damping of the reflected signal in particular, which cannot be analyzed and processed subsequently by a simple electronic device, that is by a device which is not exorbitantly expensive for the application in question.

This problem was solved by cutting out a round section of the plastic material layer opposite the sensor, between the latter and the external side of the plate glass. The publication of patent EP-A-0,641,696 in particular describes direct gluing of the sensor to the internal sheet of the external sheet of glass. In a first variant, a cylinder bore is made in the intermediate layer of plastic material and in the internal sheet of glass, the opening thus made being closed by a plug. According to a second variant, a cylinder bore is made only in the intermediate layer, the space thus provided for the sensor being simply closed by the internal sheet of glass.

In all cases, only permanent installation of the sensor on the glass plate has been anticipated which, obviously, is a disadvantage, particularly when the sensor becomes defective or ceases to function, while the window remains in perfect condition or, the opposite, when the window is broken and one desires to recover the sensor under satisfactory conditions without damaging it. Indeed, the return cost of the sensor is in most cases not negligible with respect to that of the plate glass, but it can be approximately on the same order of magnitude.

On the other hand, the publication of patent WO 95/25651 describes a sensor that is secured in a detachable manner on the internal side of a plate glass. However, this pertains to an optical type sensor whose complexity and bulkiness are incomparably greater than those of sensors in conformity with the invention.

The need is then filled for being able to provide plate glasses equipped with reliable sensors, of small weight and bulkiness, which can be installed detachably.

As a consequence, a first objective of the invention consists of a laminated plate glass, especially for a transport vehicle, which will include at least one rigid plate of glass, at least one layer of plastic material, and a sensor installed on the window to detect the presence of objects or foreign bodies on the outside of the window via a signal. It is characterized in that the side of the sensor carrying out the function of detection is held in close contact by the internal side of the external glass sheet. The sensor is placed in a space formed within sheets and/or layers of the plate glass other than the said sheet of external glass. The said space is closed in a detachable manner by means of a cap and/or lid that exerts on the sensor the desired force which is in turn applied by the sensor to the internal side of the glass sheet.

According to other characteristics in conformity with the invention:

the window includes, from the outside toward the inside, a first sheet of glass, a layer of plastic material, and a second sheet of glass, the sensor is an ultrasonic transducer that utilizes a coupling fluid inserted in water tight manner between the side of the transducer carrying out the function of sensing and the internal side of the sheet of external glass, the coupling liquid is arranged in advance on the side of the transducer that carries out the function of sensing, and protected by a water tight lid which is to be removed before installation of the sensor on the window, and the cap and/or lid exerts the desired force on the sensor through the intermediary of an elastic system such as a spring.

Figure 2:
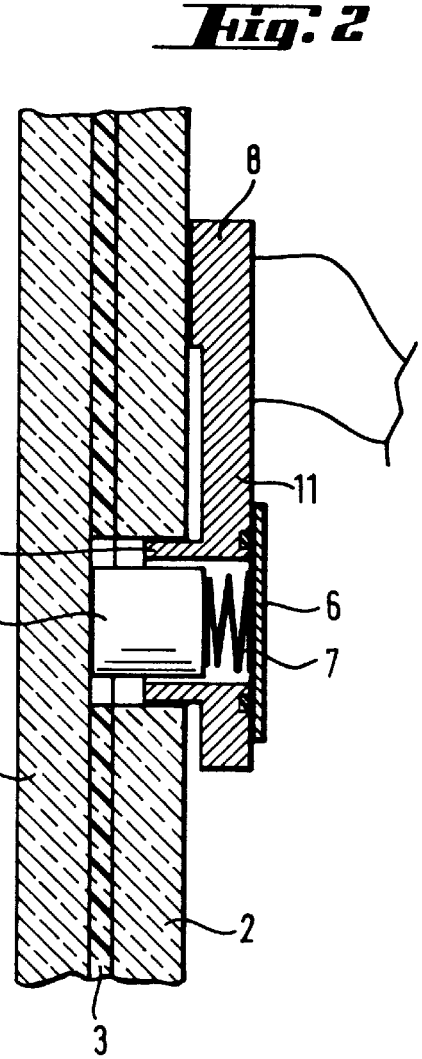
Figure 3:
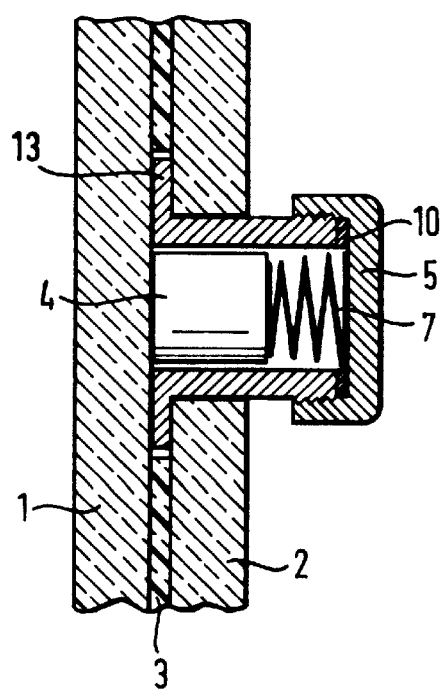

Other characteristics and advantages of the invention will be apparent from the description that follows the attached drawings in which:

FIGS. 1, 2 and 3 are, respectively, sectional schematic representations and profile views of three different modes of implementation of this invention.

With reference to FIG. 1, a window is comprised of an external sheet of glass 1, an internal sheet of glass 2, and an intermediate layer 3 made of polyvinylbutyral, designated subsequently by PVB.

Sheet 2 and layer 3 each have a cylinder bore through their entire thickness, opposite one another. In the space formed, an ultrasound transducer 4 is inserted so that its emitting and receiving side is in contact with the internal side of the external sheet 1. A cap 5 will exert, through the intermediary of a spring 7 arranged in the internal space of the cap 5 and in closing position, a force on transducer 4, in such a manner that it will hold it and keep it in close and permanent contact with the internal side of sheet 1 in order to ensure its functioning. This force can be on the order of 1 to 5 daN.

A water-tight joint 10 installed on the periphery of cap 5 ensures water-tight closing of the space for the transducer 4.

The cap 5 is closed at the end and in its extension of a part in the shape of an arm attached to a base plate 8, a base plate of an internal rear view mirror of a passenger vehicle, for example. This base plate 8 can be glued to the inside of the window or can even be attached to a vehicle body part, preferably the frame of the window.

A locking device 9 for the cap 5 in its closed position is arranged on the base plate 8. It can consist of a ratchet mechanism.

According to the mode of implementation shown in FIG. 2, the base plate 8 of a rearview mirror, not shown, includes an extension piece 11 with which it forms an assembly for fixed connection with the window. The extension piece 11 is traversed, throughout its thickness, by a cylinder bore formed, at its end facing the outside of the window, particularly by a guide component 12 that in its projection matches the shape of the said space for the sensor 4. The other end of the cylinder bore is capable of being blocked in a water-tight manner by lid 6. Although the assembly unit comprised of the base plate 8 and its extension piece 11 is in this case shown glued to the internal side of the window only in the area of the base plate 8 itself, it is also possible to effect this gluing only in the region of the extension piece 11, around the opening shown by the said space for the sensor 4.

According to a particularly beneficial characteristic of the invention, the respective and corresponding shapes of the space for sensor 4 and the guide component 12 in its projection allow fitting only in one relative position. For example, such a form that does not include an axis of symmetry, or at most one, could be suitable for this purpose. This allows one to easily obtain the desired positioning of the rear-view mirror.

On the other hand, in accordance with the two previously described variants, the cap 5 or the lid 6 is, with respect to base plate 8, sufficiently distant to allow easy opening and closing of it, without the inconvenience that overcrowding could cause for the manipulation area. This allows one to overcome the problem of ultrasound transducer functioning disturbances caused by vibrations of the rear-view mirror.

With reference to FIG. 3, the sensor 4 is not placed directly in the space enclosed by the cylinder bores in the intermediate layer 3 of PVB and in the internal sheet of glass 2, but by the intermediary of a support part 13. The section of part 13 received within PVB layer 3 has a larger section than that of the section located at the level of the thickness of sheet of glass 2. This characteristic guarantees, in the final state of the window, anchoring of the support piece 13 in the composite structure, this anchoring being ultimately completed by the PVB flow during the autoclaving operation.

The same result could also be obtained by equipping the periphery of part 13 with lugs that could be racheted to the external side of the internal glass sheet 2. Supposing that in addition, as shown previously, the section or the two sections mentioned previously, of part 13 include, for example, at most one axis of symmetry, part 13 is advantageously used to more easily obtain the desired positioning of sheets 1 and 2 and of layer 3 with respect to one another during fabrication of the window, in particular during stacking of the constituent components.

Part 13 has an extended section with respect to the internal side of the window, on which a cover 5 can be attached by screwing or racheting, a spring 7 and a water-tight joint 10 being additionally used as mentioned previously.

Of course, the sensor 4 is connected to an electric power source, in such a manner that a worker would be able to adjust it as a function of various configurations.

The invention also has as an objective a procedure for fabrication of a window including a sheet of external glass, an intermediate layer of PVB, and a sheet of internal glass. This procedure includes stages consisting in:

a) making a hole in the sheet of glass to comprise the internal sheet of glass in the site provided for subsequent installation of the sensor;

b) combining this internal sheet with a second sheet of glass which is to comprise the external sheet of glass;

c) subject the assembly unit to a convex bending procedure;

d) removing from the PVB sheet a round section for the site provided for subsequent installation of the sensor;

e) assembly of the two sheets of glass following insertion of the PVB sheet and, if necessary, a support piece;

f) putting the sensor in position, keeping it in close contact with the internal side of the external glass plate, after possible insertion of a connecting liquid; and g) inserting the cover and/or water tight and detachable lid, it being understood that in absence of the insertion of the support piece in stage e) the latter can be carried out before stage d).

In conformity with this procedure, the assembly itself is preferably carried out by successively inserting a guide component or support piece into the cylinder bore made in the sheet of internal glass and then in the one made in the sheet of PVB. This allows one to obtain perfect centering of the stacking components.

On the other hand, the invention also has as a goal a convex laminated plate glass that includes an external sheet, an internal sheet, and at least one intermediate layer, characterized in that the internal sheet of glass is provided with at least one hole made before the heat treatment of convex shaping of the glass plates in such a manner as to allow installation of the sensor as described previously.

In order to strengthen the mechanical characteristics of the window, the perimeter of the hole of the internal glass sheet is preferably subjected to compression stresses. These stresses can extend over several millimeters. For example, it can be obtained by an operation of local thermal tempering around the hole. The stresses can be approximately 5 to 40 megapascals. To accomplish this, compressed air is blown around the hole of the internal sheet normally placed above the stack comprised of the two sheets of glass, during cooling following the convex shaping process, especially on a frame, by gravity.

In order to cover up or camouflage the sensor when viewed from outside the windshield one can advantageously provide a deposit of an opaque layer such as a layer of enamel on the internal side of the sheet of external glass 1 at the time of window fabrication. This deposit can be carried out by depositing a compound of enamel, especially by silk screening, followed by simultaneous firing during the convex shaping operation.

This deposit can be provided in the extension of the enamel frame, which is generally provided for windows that are to be glued if the latter is done on the internal side of the sheet of external glass 1.

It also allows one to camouflage possible defects of PVB gluing in the area of the hole in the window. The layer of enamel can thus be replaced by another opaque layer (black priming coat, etc.).

A last objective of the invention consists of a sensor that can be used for fabrication of a window as described previously, characterized in that it includes on one of its sides a connecting liquid which is positioned ahead of time and protected by a water-tight lid that is to be removed before installation of the sensor on the window.

We claim:

1. Laminated plate glass window for a transport vehicle comprising:

a rigid sheet of glass forming an external layer of the laminated plate glass window;

at least one layer of plastic material contacting said rigid sheet of glass;

a sensor installed on the laminated plate glass window to sense the presence of objects or foreign bodies on an outside of the laminated plate glass window, a side of the sensor carrying out the function of detection being held in close contact with an internal side of the rigid sheet of glass, wherein the sensor is positioned in a space formed within the laminated plate glass window interiorly of the rigid sheet of glass; and a detachable cover or lid covering the space and exerting a force on the sensor so as to hold the sensor in close contact with the internal side of the rigid sheet of glass.

2. A laminated plate glass window according to claim 1, further comprising a second rigid sheet of glass contacting the at least one layer of plastic material.

3. A laminated plate glass window according to claim 1 or 2, wherein the sensor is an ultrasound transducer that utilizes a connecting liquid inserted in a water-tight manner between the side of the transducer carrying out the function of detection and the internal side of the external layer of the laminated plate glass window.

4. A laminated plate glass window according to claim 3, wherein the connecting liquid is deposited in advance on the side of the transducer which carries out the function of detection, and protected by the detachable cover or lid that is water tight and which is to be removed before installation of the sensor on the laminated plate glass window.

5. A laminated plate glass window according to claim 1, wherein the detachable cover or lid exerts the desired amount of force on the sensor through the intermediary of an elastic system such as a spring positioned between the sensor and the detachable cover or lid.

6. A laminated plate glass window according to claim 1, wherein said detachable cover or lid is attached to a base plate of an internal rear-view mirror.

7. A laminated plate glass window according to claim 6, wherein the base plate is attached to an internal side of the laminated plate glass window or to a vehicle body part by any suitable means and includes a locking device of the detachable cover or lid in its closing position of the said space, which is to be used for the site of the sensor, the detachable cover or lid is provided on its periphery, opposite that of the said space, with a water-tight joint.

8. A laminated plate glass window according to claim 1, wherein said detachable cover or lid is capable of closing the said space to be used for the site of the sensor by surrounding a traversing cylinder bore formed in an extension part of the base plate of an inside rear-view mirror, said base plate being attached to an internal side of the laminated plate glass window by any suitable method, and said traversing cylinder bore is formed on its end opposite that which is to receive the detachable cover or lid, in a guide component, which projects outward matching the shape of the said space for the sensor.

9. A laminated plate glass window according to claim 8, wherein the base plate of the rear-view mirror and its extension piece are attached with glue, only in the region of the base plate itself, on the internal side of the laminated plate glass window.

10. A laminated plate glass window according to claim 8, wherein the base plate of the rear-view mirror and its extension piece are attached with glue, only in the region of the said extension piece, around the opening which the said space presents for the sensor, on the internal side of the laminated plate glass window.

11. A laminated plate glass window according to claim 8, wherein said space to be used for the sensor is of a shape that it can receive the said guide component that projects out only in a single position of the latter, so that the desired positioning of the rear-view mirror will be easily achieved.

12. A laminated plate glass window according to claim 6, wherein the detachable cover or lid is shifted, with respect to the base plate of the rear-view mirror, a sufficient distance to allow easy opening and closing of it and to prevent vibrations of the rear-view mirror from disturbing the sensor when it is functioning.

13. A laminated plate glass window according to claim 2, wherein the sensor is not located directly in the space enclosed within the at least one layer of plastic material and of the second rigid sheet of glass, but in a support piece whose shape will correspond to that of the cylinder bores made in the at least one layer of plastic material and in the second rigid sheet of glass, allows one to easily obtain the desired positioning of the support piece, of the two sheets of rigid glass and of the at least one layer of plastic material which constitute the laminated plate glass window with respect to one another and contribute, in the final stage of the laminated plate glass window, in keeping the support piece stationary in its desired position.

14. A convex-shaped laminated window according to claim 2, wherein the second rigid sheet of glass is provided with at least one hole made before a thermal treatment of convex shaping of the second rigid sheet of glass and the external layer of the laminated plate glass window in such a manner as to allow installation of a sensor.

15. A convex-shaped laminated window in accordance with claim 14, wherein the perimeter of the hole includes compression stresses.

16. A convex-shaped laminated window in accordance with claim 14 or 15, further comprising an opaque layer such as a layer of enamel or black primer deposited on one part of the internal side of the sheet of external glass, which is sufficient to cover up the sensor when viewed from outside the window.

17. A sensor that can be used for making a laminated plate glass window in accordance with claim 1, wherein on one of its sides, a connecting liquid deposited in advance and protected by a water-tight cover or lid to be removed before installation of the sensor on the laminated plate glass window.

\* \* \* \* \*